US005641583A

United States Patent [19]

Bringley et al.

[11] Patent Number: 5,641,583

[45] Date of Patent: Jun. 24, 1997

[54] RADIOGRAPHIC PHOSPHOR PANEL HAVING BOTH BINDER COMPATIBLE OXOSULFUR STABILIZER AND OXOSULFUR PIGMENT AND METHOD FOR PREPARING PHOSPHOR PANEL

[75] Inventors: Joseph F. Bringley, Rochester; Philip Steven Bryan, Webster; Andrea Marie Hyde, Hamlin, all of N.Y.

[73] Assignee: Eastman Kodak Company, Rochester, N.Y.

[21] Appl. No.: 417,282

[22] Filed: Apr. 5, 1995

Related U.S. Application Data

[63] Continuation-in-part of Ser. No. 157,796, Nov. 24, 1993, Pat. No. 5,427,868, and a continuation-in-part of Ser. No. 157,797, Nov. 24, 1993, abandoned.

[51] Int. Cl.[6] .................................................. C09K 11/61

[52] U.S. Cl. ...................... 428/691; 428/690; 250/483.1; 250/484.2; 252/301.9 H; 252/301.4 S

[58] Field of Search ................................ 250/483, 484.2, 250/483.1; 428/690, 917, 691; 252/301.4 H, 301.4 S

[56] References Cited

U.S. PATENT DOCUMENTS

| | | |
|---|---|---|
| 2,502,529 | 4/1950 | Murray . |
| 2,887,379 | 5/1959 | Blake et al. . |
| 3,023,313 | 2/1962 | De La Mater et al. . |
| 3,300,310 | 1/1967 | Kennard et al. . |
| 3,300,311 | 1/1967 | Kennard et al. . |
| 3,617,285 | 11/1971 | Staudenmayer . |
| 3,743,833 | 7/1973 | Martic et al. . |
| 3,836,784 | 9/1974 | Bates et al. . |
| 4,350,893 | 9/1982 | Takahashi et al. . |
| 4,360,571 | 11/1982 | Rabatin . |
| 4,374,905 | 2/1983 | Rabatin . |
| 4,380,702 | 4/1983 | Takahashi et al. . |
| 4,491,736 | 1/1985 | Teraoka . |
| 4,505,989 | 3/1985 | Umemoto et al. . |
| 4,913,333 | 4/1990 | Roberts et al. . |
| 5,145,743 | 9/1992 | Beutel et al. . |

FOREIGN PATENT DOCUMENTS

| | | |
|---|---|---|
| 0 234 385 B1 | 9/1991 | European Pat. Off. . |
| 2 017 140 | 10/1979 | United Kingdom . |

OTHER PUBLICATIONS

*Research Disclosure*, vol. 154, Feb. 1977, Item 15444.

*Research Disclosure*, vol. 176, Dec. 1978, Item 17643, Section XVII.

*Research Disclosure*, vol. 184, Aug. 1979, Item 18431, Section I.

*Treatise on Organic and Theoreitcal Chemistry*, J.W. Mellor (Ed), Longmar Green & Co., New York, vol. 10, 1930, p. 514.

H. Distler, *Angew Chem.*, (Intl. Ed.), vol. 6, 1967, p. 554.

Peak & Watkins, *J. Chem. Soc.*, (London), 1951, p. 3292.

*Primary Examiner*—Charles Nold

*Attorney, Agent, or Firm*—Carl O. Thomas

[57] ABSTRACT

A radiographic phosphor panel having both binder compatible oxosulfur reducing agent and oxosulfur reducing pigment, and a preparation method. The radiographic phosphor panel has a support and a luminescent layer overlaying the support. The luminescent layer includes phosphor crystals, binder, oxosulfur reducing agent, and oxosulfur reducing pigment. The phosphor crystals include iodine. The oxosulfur reducing agent is dispersed within the luminescent layer on a substantially molecular basis. The oxosulfur reducing pigment is dispersed within the layer as a particulate. The oxosulfur reducing agent and the oxosulfur reducing pigment are each a reducing agent for iodine. The oxosulfur reducing agent and the oxosulfur reducing pigment have a combined concentration sufficient to substantially increase the photostimulated luminescence of the panel.

20 Claims, No Drawings

RADIOGRAPHIC PHOSPHOR PANEL HAVING BOTH BINDER COMPATIBLE OXOSULFUR STABILIZER AND OXOSULFUR PIGMENT AND METHOD FOR PREPARING PHOSPHOR PANEL

CROSS-REFERENCE TO RELATED APPLICATIONS

This is a continuation-in-part application of application Ser. No. 08/157,796, filed Nov. 24, 1993, now U.S. Pat. No. 5,427,868, entitled "Radiographic Phosphor Panel Having Binder Compatible Oxosulfur Stabilizer and Method for Preparing Phosphor Panel," by Joseph F. Bringley et al; and is a continuation in part of Application Ser. No 08/157 797 filed Nov. 24, 1993, now abandoned, entitled "Pigment Stabilized Radiation Image Storage Panel and Method for Preparing Radiation Image Storage Panel," by Joseph F. Bringley et al.

FIELD OF THE INVENTION

The invention relates to radiographic phosphor panels and methods related to their use. The invention more particularly relates to image storage panels and prompt emission panels having both binder compatible oxosulfur stabilizing agent and oxosulfur pigment and preparation methods.

BACKGROUND OF THE INVENTION

A radiographic phosphor panel contains a layer of phosphor, a crystalline material which responds to X-radiation on an image-wise basis. Like many other crystalline materials, radiographic phosphors have a crystal matrix which allows for the replacement of some atoms by other similar atoms, but does not readily accept other atoms or moieties. Radiographic phosphor panels can be classified, based upon their phosphors, as prompt emission panels and image storage panels.

Intensifying screens are the most common prompt emission panels. Intensifying panels are used to generate visible light upon exposure of the intensifying panel to X-radiation. A sheet of photographic film is positioned to intercept the visible light generated and commonly is pressed against the intensifying panel within a light-tight cassette. Other prompt emission panels operate similarly, but in place of the photographic film have some other means for visualizing the X-radiation.

Storage panels have storage phosphors, that have the capability of storing latent X-ray images for later release, apparently by locally trapping electron-hole pairs created by incident X-rays. Storage phosphors are distinguishable from the phosphors used in X-ray intensifying or conventional screens. In the latter, a latent image is not stored and X-radiation causes the immediate release of visible light from irradiated phosphor crystals.

Radiation image storage panels are used in computed radiography. The panel is first exposed to X-radiation to create a latent image. The panel is then stimulated with longer wavelength radiation, resulting in the emission of radiation at a third wavelength. Typically a laser having a red or infrared beam is scanned over the panel, resulting in the emission of green or blue radiation. The emitted light is collected and the resulting signal is processed electronically to produce a final image.

Degradation of final images due to panel discoloration has long been recognized for intensifying screens. There has not, however, been agreement as to the source of that discoloration. What has been noticed is that screens subject to prolonged exposure to photographic film have tended to become discolored. U.S. Pat. Nos. 4,374,905 and 4,360,571 state that the discoloration is due to "volatile organic constituents escaping from the associated photographic film" (U.S. Pat. No. 4,374,905, column 1, lines 40–59 and U.S. Pat. No. 4,360,571, column 1, lines 46–64). Great Britain Patent Application No. GB 2 017 140 A states:

> "[I]t has been discovered that screens containing lanthanum-oxy-halide phosphors tend to discolor rapidly when in use and in particular when held in contact with an X-ray film, . . .
>
> "Gadolinium-oxy-halides are similar . . .
>
> "In spite of intensive research into this discolouration defect the cause of it is not yet clearly known but it appears to be a complex reaction caused, in part at least, by the hydroscopic nature of the lanthanum-oxy-halide phosphors or gadolinium-oxy-halide phosphors, the nature of the binder and the presence of the X-ray film held in contact with the screen for a period of time.
>
> "Furthermore, under somewhat different conditions of use X-ray screens and in particular X-ray screens which contain lanthanum-oxyhalide or gadolinium-oxyhalide phosphors can lose speed due to a different defect which appears to involve only the phosphor. This is hydrolysis of the phosphor which is caused by water present in the phosphor layer due either to atmospheric moisture or aqueous cleaning fluid penetrating the protective layer of the screen. It is thought that quantities of halide or more surprisingly, the free halogen, released by hydrolysis may actually catalyse the discolouration of the binder or of compounds having migrated from the film."(page 1, lines 14–33)

In U.S. Pat. No. 4,360,571, to Rabatin, phosphors were treated with fatty acids or metal salts of fatty acids to prevent discoloration by "volatile organic constituents" and attack by water. In GB 2 017 140 A, intensifying screens were stabilized against discolouration and hydrolysis by incorporation of a compound containing a free epoxy group and, optionally, a dialkyl tin compound such as dibutyl tin diocytl as an additional stabilizer.

Yellowing of a phosphor layer of a radiation image storage phosphor panel, in which the phosphor contains iodine, is described in European Patent Specification No. EP 0 234 385 B1. The yellowing is ascribed to liberation of free iodine. The solution taught for the yellowing problem, is incorporation in the phosphor layer of a compound containing a free epoxy group and/or a compound selected from: phosphites, organotin compounds, and metal salts of organic acids, specifically: octylic acid, lauric acid, stearic acid, oleic acid, ricinoleic acid naphthenic acid, 2-ethylhexanoic acid, resin acid, synthetic carboxylic acid, benzoic acid, salicylic acid, organic phosphinous acid, phenol, and alkylphenol.

Pigments have been added to phosphor panels to absorb light of a particular wavelength (colored pigments), to scatter light (non-absorbing or white pigments) to increase resolution, or to act as stabilizers. Storage panels have more recently become available in which good resolution is provided without the use of white pigments.

U.S. Pat. No. 5,145,743 to Beutel teaches the addition of $BaSO_4$ or other white pigment particles to the surface of phosphor crystals (by milling or the like)to increase resolution, but somewhat lower speed. The pigment particles are in a concentration of 0.05 to 0.45 weight percent based on the weight of the phosphor. At a concentration of 0.5 weight percent based on the weight of the phosphor, the speed decrease was undesirably large.

U.S. Pat. No. 4,350,893 to Takahashi et al teaches the addition of white pigment to a storage panel to enhance resolution. The white pigment is added in a range of 0.01 to 1 part by weight per one part by weight of the stimulable phosphor (1 to 100 weight percent based upon the weight of the phosphor). Takahashi, contrary to the above-cited De La Mater and Bates patents, characterizes the intensifying screen art as teaching that added pigment increases speed rather than resolution:

> "In the conventional radiography, it is well known to disperse a white powder in the fluorescent layer of an intensifying screen. However, quite unlike the present invention, a white powder is dispersed in the fluorescent layer of an intensifying screen to efficiently utilize the light (instantaneous light) emitted by a phosphor, thereby improving the speed of the intensifying screen. In contrast to this, in the present invention, a white powder is dispersed in the fluorescent layer of a radiation image storage panel to control the spread of stimulating rays in the fluorescent layer, thereby improving the sharpness of the image obtained."

U.S. Pat. No. 4,374,905, to Rabatin, teaches a solution to both discoloration by "volatile organic constituents" and attack by water. The phosphor for an intensifying screen was milled with anhydrous $MgSO_4$ or $ZnSO_4$ (0.5 to 4 weight percent) during preparation of the screen. It was proposed that the protective action was based upon the reaction:

$$MgSO_4+2HOH \rightarrow Mg(OH)_2+2H^++SO_4^{2-}$$

U.S. Pat. No. 3,836,784, to Bates et al, teaches that small amounts of "stabilizers", such as sodium thiosulfate or potassium thiosulfate can be included in the fluorocarbon binder of an intensifying screen. Bates et al, which used an iodide containing phosphor, noted:

> "[A]ctivated iodide phosphors are extremely hygroscopic. Absorption of small amounts of water rapidly reduces the conversion efficiency to a vanishingly small value. In order to employ activated iodide phosphors it is therefore necessary to provide the activated iodide phosphor in the screen in a form in which it remains stable for long periods of time.

> "Various ways have been taught for using thallium activated potassium iodide and protecting the iodide from moisture." (Bates et al, column 1, lines 20–30)

> "in addition to the sodium activated cesium iodide, other materials may be included in the fluorocarbon binder. Pigments may be added to enhance resolution, e.g. titanium dioxide and zirconium dioxide. The amount of pigment will generally be in the range of 0 to 10 weight percent based on the phosphor. Small amounts of stabilizers may be included, such as sodium or potassium thiosulfate." (column 3, lines 32–39)

U.S. Pat. No. 3,023,313 to De La Mater et al teaches an intensifying screen in which a first white pigment is added in a preferred concentration of 5–10 percent based upon the weight of the phosphor and an additional second pigment, sodium or potassium thiosulfate, is added as a "stabilizer" In the examples in De La Mater, sodium thiosulfate has a concentration of 1 or 3 or 7.5 percent based upon weight of the phosphor. De La Mater teaches that the resolution of the screen is increased without a substantial loss of speed in the preferred pigment concentration range.

Radiation image storage panels, unlike intensifying screens, are subject to degradative losses of both emitted light and stimulating radiation. Since these effects are cumulative, discoloration can be an even more serious issue in storage panels than in intensifying screens.

It would be desirable to provide improved prompt emission and radiation image storage panels with stability against yellowing and improved methods for preparing radiographic phosphor panels.

SUMMARY OF THE INVENTION

The invention, in its broader aspects, provides a radiographic phosphor panel having both a binder-compatible oxosulfur reducing agent and an oxosulfur reducing pigment, and a preparation method. The radiographic phosphor panel has a support and a luminescent layer overlaying the support. The luminescent layer includes phosphor crystals, binder, oxosulfur reducing agent, and oxosulfur reducing pigment. The phosphor crystals include iodine. The oxosulfur reducing agent is dispersed within the luminescent layer on a substantially molecular basis. The oxosulfur reducing pigment is dispersed within the layer as a particulate. The oxosulfur reducing agent and the oxosulfur reducing pigment are each a reducing agent for iodine. The oxosulfur reducing agent and the oxosulfur reducing pigment have a combined concentration sufficient to substantially increase the photostimulated luminescence of the panel.

It is an advantageous effect of at least some of the embodiments of the invention that radiation image storage panels and prompt emission panels and methods for stabilizing phosphor panels are provided which exhibit improved performance and enhanced stabilization against yellowing.

DESCRIPTION OF PARTICULAR EMBODIMENTS

The radiographic phosphor panel of the invention comprises a support and a luminescent layer which includes phosphor crystals. The luminescent layer or a layer adjoining the luminescent layer includes both a binder-compatible oxosulfur reducing agent and an oxosulfur reducing pigment. The following description is primarily directed to radiographic image storage panels, however, the invention is not limited to storage panels; but is also applicable to prompt emission panels such as intensifying screens.

The binder compatible oxosulfur reducing agent and the oxosulfur reducing pigment (also referred to collectively herein as "oxosulfur stabilizers") are both oxygen-and-sulfur-containing species capable of reducing free (molecular) iodine according to the half-reaction:

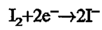

$$I_2+2e^- \rightarrow 2I^-$$

The binder compatible oxosulfur reducing agent and the oxosulfur reducing pigment both include a moiety or ion of the general formula $$S_jO_k,$$

where j and k are positive integers such that the ratio, j/k is defined by $$0.25 < j/k < 1.0.$$

This formula is inclusive of species in which $S_jO_k$ is a free ion and species in which $S_jO_k$ is a charge bearing moiety covalently linked to another group. The oxosulfur stabilizers are described herein inclusively of both uncharged species and charged anions. Where a distinction is necessary, for example, between a salt and its disassociated ion, it will be understood from context.

The oxosulfur reducing pigment has an $S_jO_k$ ion such as: $SO_3^{2-}$, $S_2O_4^{2-}$, $S_2O_3^{2-}$, $S_2O_5^{2-}$, or $S_4O_6^{2-}$. Salts of $SO_4^{2-}$, $SO_5^{2-}$, and $S_2O_8^{2-}$ do not meet the above-indicated j/k ratio and are not oxosulfur reducing pigments for molecular iodine. In a particular embodiment of the invention, the oxosulfur reducing pigment for iodine includes the thiosulfate moiety $S_2O_3^{2-}$, which can be represented by the formula:

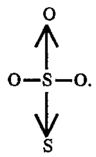

The central atom of sulfur has an oxidation number of 6+ and the outer sulfur atom has an oxidation number of 2−. Thiosulfate reacts with free (molecular) iodine in accordance with the following equation:

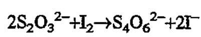

$$2S_2O_3^{2-}+I_2 \rightarrow S_4O_6^{2-}+2I^-$$

In another particular embodiment of the invention, the oxosulfur reducing pigment is a polythionate. Polythionate ions are often represented by the general formula:

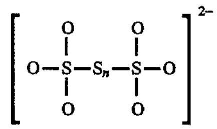

where n is from 1 to 22 or higher. The polythionate: $S_4O_6^{2-}$, which is commonly known as tetrathionate, is a product of the reaction of thiosulfate and free iodine.

Preferred oxosulfur reducing pigments have the general formula $$D_nS_jO_k,$$

where j and k are defined as above and $D_n$ represents n cations chosen such that charge neutrality is obeyed. Cations in the oxosulfur reducing pigments, can be selected on the basis of light-scattering capability (whiteness) of the pigment, convenience, and non-interference with the desired characteristics of the storage panel produced. The determination of suitable whiteness for a pigment, or particular grade of pigment, is a matter of simple experimentation and is well known to those skilled in the art. For example, U.S. Pat. No. 4,350,893 at column 4, lines 30–54 teaches a whiteness evaluation test which could be utilized. Suitable counterions include: $Ba^{2+}$, $Mg^{2+}$, $Na^+$, $K^+$, and $NH_4^+$. A great variety of other cations could be used. One skilled in the art, by use of references; such as *Treatise on Inorganic and Theoretical Chemistry*, J. W. Mellor, ed., Longmar, Green, & Co., New York, (1930), Vol. 10, p. 514; and/or simple experimentation could readily ascertain great numbers of oxosulfur reducing pigments.

The oxosulfur reducing pigment is dispersed in particulate form in the luminescent layer of the storage panel of the invention or in an overcoat layer adjoining the luminescent layer. A preferred median particle size is from 0.01 to 4 micrometers. It is more preferred that the median particle size be from 0.1 to 1 micrometer and that the range of particle sizes be substantially from 0.01 to 4 micrometers, that is, that particles outside the indicated range be limited to trace amounts.

Oxosulfur reducing pigments are comparable in reflectance and light scattering to other white pigments such as barium sulfate. Reflection coefficients can, of course, vary slightly depending upon particle shape, particle size, purity and the like; however, even with such variation, in the absence of high impurity levels, the oxosulfur reducing pigments of the invention are highly reflective.

The binder-compatible oxosulfur reducing agent is not dispersed in particulate form in the binder, but rather is dispersed on a molecular basis or on a substantially molecular basis. Binder-compatible is, for example, inclusive of what is sometimes referred to as a "solid solution" of oxosulfur reducing agent in binder. The term "binder-compatible" is also, for example, inclusive of a solid solution within one phase of a two phase system. The oxosulfur reducing agent and binder, necessarily, have solubility properties in common. Both oxosulfur reducing agent and binder can be dissolved in the same solvent and then solvent-cast to form a single substantially uniform layer. In the phosphor panel, the oxosulfur reducing agent and binder provide a solvent-cast matrix for the phosphor and any other particulate addenda. For an organic polymer binder, binder-compatible oxosulfur reducing agents include organic salts of oxosulfur anions having the formula, $S_jO_k$, and Bunte compounds.

Organic salt oxosulfur reducing agents commonly have the general formula:

$$DS_jO_k$$

in which D is the organic cation chosen such that charge neutrality is obeyed. $S_jO_k$ ions of these oxosulfur reducing agents include: $SO_3^{2-}$, $S_2O_4^{2-}$, $S_2O_3^{2-}$, $S_2O_5^{2-}$, and $S_4O_6^{2-}$. $S_jO_k$ ions do not include $SO_4^{2-}$, $SO_5^{2-}$, and $S_2O_8^{2-}$, since these ions do not meet the above-indicated j/k ratio and are not reducing agents for molecular iodine.

In a particular embodiment of the invention, the oxosulfur reducing pigment for iodine includes the thiosulfate moiety $S_2O_3^{2-}$, which can be represented by the formula:

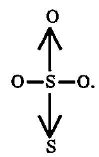

The central atom of sulfur has an oxidation number of 6+ and the outer sulfur atom has an oxidation number of 2−. Thiosulfate reacts with free (molecular) iodine in accordance with the following equation:

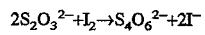

$$2S_2O_3^{2-}+I_2 \rightarrow S_4O_6^{2-}+2I^-$$

In another particular embodiment of the invention, the oxosulfur reducing pigment is a polythionate. Polythionate ions are often represented by the general formula:

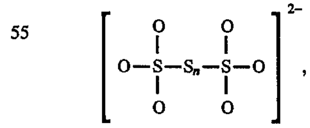

where n is from 1 to 22 or higher. The polythionate: $S_4O_6^{2-}$, which is commonly known as tetrathionate, is a product of the reaction of thiosulfate and free iodine.

The organic cation "D" in the $DS_jO_k$ salts can be selected on the basis of convenience, non-toxicity, non-hygroscopicity, solubility in the solvent for a particular binder and non-interference with the desired characteristics of the panel produced. It is generally preferred that the oxosulfur reducing agent and the product of its reaction with iodine, be colorless, however, some coloration, within a suitable wavelength range could be accommodated. High solubility of the oxosulfur reducing agent in the binder solvent is believed to help assure a uniform distribution of the oxosulfur reducing agent. Results with Bunte salts, discussed below, indicate that increased solubility in solvent for the binder is correlated with a decreased rate of yellowing, that is, greater stability over time. This phenomenon is not understood and seems to be counter-intuitive, particularly in view of the high volatility of free iodine. Suitable organic cations include quaternary ammonium salts, quaternary phosphonium salts, iminium salts and other complex organic and organo-metallic cations. Specific examples of the these cations include: tetraethylammonium, tetrabutylammonium, and bis(triphenylphosphine)iminium. A specific example of a binder-compatible $DS_jO_k$ salt oxosulfur reducing agent is bis(tetraethylammonium) thiosulfate, $((CH_3CH_2)_4N)_2S_2O_3$.

Bunte compounds or Bunte salts have the general structure:

$$R'SSO_3D',$$

Bunte compounds reduce free iodine in reaction schemes like the following:

$$R'SSO_3D'+I_2+H_2O \rightarrow R'S\text{-}SR'+D'HSO_4+HI$$

In the above equations, R' is a covalently bonded organic substituent and D' is a counterion.

Suitable R' groups include primary and secondary alkyl, having from 1 to 20 carbons. R' can be substituted or unsubstituted. Substituents should not cause deleterious effects, such as increased risk of toxicity. Substituents can be inert, that is non-reactive with other materials during preparation and use of the panel or, can be a basic organic group capable of reacting with HI. Suitable basic organic groups include $SO_2$, $COOR^1$, where $R^1$ is an organic or inorganic cation; $NR^2$, where each $R^2$ is independently H or substituted or unsubstituted alkyl, aryl, or heteroaryl. It is believed that the basic organic group plays a role in the stabilization of the screen by scavenging unstable hydriodic acid (HI), which is a by product of the reaction of Bunte compounds with iodine. For example, the carboxylate group reacts with HI according to the equation:

$$\text{—}COOR^1+HI \rightarrow R^1I+\text{—}COOH$$

In the above reaction HI, which is known to be unstable towards oxidation, is converted to the more stable $R^1I$.

The counterion D' in the oxosulfur reducing agent formulas above, can be a simple inorganic cation or a complex organic or inorganic cation. D' can be selected on the basis of convenience, non-toxicity, non-hygroscopicity, solubility in the solvent for a particular binder and non-interference with the desired characteristics of the panel produced. Suitable D' cations include the organic cations discussed above and simple inorganic cations.

The Bunte compound is normally chosen so that the Bunte compound itself and the products of the reaction with iodine are colorless in the region 350–750 nanometers, so as to prevent the coloration of the screen and the associated degradation of its performance. The products of the reaction with iodine, neutrality, should also be stable toward water, air, light and heat.

Specific examples of suitable Bunte compounds include: $CH_3(CH_2)_4S_2O_3Na$, $Mg(O_2C(CH_2)_4S_2O_3Na)_2$, $Mg(S_2O_3CH_2CH_2NH_2)_2$, $KO_2C(CH_2)_4S_2O_3K$, $NaO_2C(CH_2)_7S_2O_3Na$, and $Mg(O_2C(CH_2)_4S_2O_3)$.

Bunte compounds can be produced by the sulfonatothiode-halogenation of alkyl halides with thiosulfate or by one of the many methods disclosed in H. Distler, *Angew. Chem.* (Intl. Ed.), Vol. 6, (1967) p. 554.

The total concentration of oxosulfur stabilizer in the luminescent layer and/or overcoat layer of the panels of the invention is sufficient to increase photostimulated luminescence relative to a control panel having no oxosulfur stabilizer, while maintaining high image sharpness, i.e. resolution, and providing improved protection against yellowing. There is theoretically no upper limit on the concentration of oxosulfur reducing agent in the layers of the panel, however, deterioration of panel characteristics at very high concentrations of oxosulfur reducing agent is expected, if, by no other means than displacement of phosphor or binder. An acceptable total or combined concentration for both oxosulfur stabilizers is up to about 10 weight percent relative to the weight of the phosphor. A more convenient concentration is up to about 4 weight percent relative to the weight of the phosphor. Relative percentages of the binder compatible stabilizer and the pigment stabilizer can be varied, however, it is generally desirable to maximize speed. Good speeds can be provided by use of only the binder-compatible stabilizer, however, binder-compatible oxosulfur reducing agent is much more expensive than oxosulfur reducing pigment. A combination of binder-compatible oxosulfur reducing agent and oxosulfur reducing pigment provides good speeds and reasonable cost. A useful ratio of binder compatible oxosulfur reducing agent to oxosulfur reducing pigment is from about 1:20 (parts by weight:parts by weight) to about 10:1 (parts by weight:parts by weight). In a particular embodiment of the invention, the combination of binder-compatible oxosulfur reducing agent and oxosulfur reducing pigment can provide a greater speed than the use of the same weight of binder-compatible oxosulfur reducing agent.

In particular embodiments of the invention, it may be desirable to add, in addition to oxosulfur reducing pigment if any, an additional white pigment. The amount of additional white pigment that can be added is limited, however, since it contributes to the total pigment concentration. Suitable pigments, are well known to those skilled in the art and include materials such as titania and barium sulfate.

The phosphor in the storage panel is chosen from radiographic phosphors subject to iodine-associated discoloration; for example, divalent alkaline earth metal fluorohalide storage phosphors containing iodine and alkali metal halide storage phosphors containing iodine. A mixture of phosphors, at least one of which contains iodide, could also be used, if desired, to form a panel having optimal properties for a particular application. Panel constructions containing more than one phosphor-containing layer are also possible, with iodine containing phosphors being present in one or more of the phosphor-containing layers.

In particular embodiments of the invention, the phosphor is a storage phosphor which is the product of firing starting materials comprising a combination of species characterized by the relationship:

$$MFX_{1-z}I_z \cdot uM^aX^a{:}yA{:}eQ{:}tD,$$

where M is selected from Mg, Ca, Sr, and Ba; X is selected from Cl and Br; Ma is selected from Na, K, Rb, and Cs; $X^a$ is selected from Cl, Br, and I; A is selected from Eu, Ce, Sm, and Tb; Q is an oxide selected from BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$; and D is selected from V, Cr, Mn, Fe, Co, and Ni. Numbers are represented by the following: z is from $1\times10^{-4}$ to 1, u is from 0 to 1, y is from $1\times10^{-4}$ to 0.1, e is from 0 to 1, or more preferably from $1\times10^{-5}$ to 0.1, and t is from 0 to $1\times10^{-2}$ The same designations appearing elsewhere herein have the same meanings unless specifically stated to the contrary. Groups of materials, for example the materials defined by M, are to be understood as inclusive of combinations of materials in that group.

In some of those embodiments of the invention, the panel includes a divalent alkaline earth metal fluorohalide storage phosphor containing iodine which is the product of firing an intermediate, a combination of species characterized by the relationship:

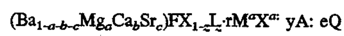

$$(Ba_{1-a-b-c}Mg_aCa_bSr_c)FX_{1-z}I_z \cdot rM^aX^a : yA : eQ$$

where X, $M^a$, $X^a$, A, Q, z, y, and e have the same meanings as in formula (1) and the sum of a, b, and c is from 0 to 0.4, and r is from $1\times10^{-6}$ to 0.01. $M^a$ can be potassium and r can be from $1\times10^{-4}$ to 0.01, as described in U.S. patent application Ser. No. 08/157,583, filed Nov. 24, 1993, now abandoned in favor of Continuation-in-Part application Ser. No. 08/300,116, filed Sep. 2, 1994. The phosphor can be one of those described in U.S. patent application Ser. No. 08/157,582, filed Nov. 24, 1993, now abandoned in favor of Continuation-in-Part application Ser. No. 08/300,113, filed Sep. 2, 1994. In that patent application, barium fluorohaloiodide phosphor is produced by firing a combination of species that includes one or more oxosulfur reducing agents or pigments. (The oxosulfur reducing agents and oxosulfur reducing pigments are the same as those disclosed herein). The oxosulfur reducing agent and/or oxosulfur reducing pigment is present, in an unfired precursor mixture, in an amount sufficient to increase relative photostimulated luminescence intensities relative to the same phosphor absent the oxosulfur stabilizer. The unfired precursor defines an upper limit for the presence of sulfur atoms in the resulting phosphor. In one of the phosphors disclosed, sulfur atoms are present in the unfired precursor, and thus in the crystals of the resulting phosphor, in a molar ratio of sulfur atoms to alkaline earth metal of less than 0.20, or preferably, less than 0,020. In another phosphor disclosed, the minimum amount of sulfur atoms present in the unfired composition is in a molar ratio of sulfur atoms to alkaline earth metal of greater than $1\times10^{-4}$ and less than 0,020. Oxosulfur reducing species is believed to be retained in the phosphors after firing, but its presence, oxidation number and other characteristics are not confirmed.

The luminescent layer of the phosphor panel of the invention contains a polymeric binder to give it structural coherence. In general the binders useful in the practice of the invention are those conventionally employed in the art. Binders are generally chosen from a wide variety of known organic polymers which are transparent to x-rays, stimulating, and emitted light. Binders commonly employed in the art include sodium o-sulfobenzaldehyde acetal of poly(vinyl alcohol); chlorosulfonated poly(ethylene); a mixture of macromolecular bisphenol poly(carbonates) and copolymers comprising bisphenol carbonates and poly (alkylene oxides); aqueous ethanol soluble nylons; poly (alkyl acrylates and methacrylates) and copolymers of poly (alkyl acrylates and methacrylates with acrylic and methacrylic acid); poly(vinyl butyral); linear polyesters; and poly(urethane) elastomers. These and other useful binders are disclosed in U.S. Pat. Nos. 2,502,529; 2,887,379; 3,617,285; 3,300,310; 3,300,311; and 3,743,833; and in Research Disclosure, Vol. 154, February 1977, Item 15444, and Vol. 182, June 1979. *Research Disclosure* is published by Kenneth Mason Publications, Ltd., Emsworth, Hampshire P010 7DD, England. Particularly preferred binders are poly (urethanes), such as those commercially available under the tradename Estane, from Goodrich Chemical Co., the tradename Permuthane from the Permuthane Division of ICI, and the tradename Cargill from Cargill, Inc.

Any conventional ratio of phosphor to binder can be employed. Generally thinner phosphor layers and sharper images are realized when a high weight ratio of phosphor to binder is employed. Preferred phosphor to binder ratios are in the range of from about 7:1 to 25:1 for panel constructions intended to withstand commercial exposure repetitions without loss of structural integrity. For limited or single exposure applications it is, of course, appreciated that any minimal amount of binder consistent with structural integrity is satisfactory.

For the highest attainable speeds a white support, such as a titania or barium sulfate loaded or coated support is employed. Particular reflective supports which offer a balance of speed and sharpness are those containing reflective microlenslets, such as are disclosed in U.S. Pat. No. 4,912,333 to Roberts, et al. In those instances in which it is desired to reduce the effective thickness of a phosphor layer below its actual thickness the phosphor layer is modified to impart a small, but significant degree of light absorption. If the binder is chosen to exhibit the desired degree of light absorption, then no other ingredient of the phosphor layer is required to perform the light attenuation function. It is specifically noted that the less structurally complex chromophores for ultraviolet absorption particularly lend themselves to incorporation in polymers. A separate absorber can be incorporated in the phosphor layer to reduce its effective thickness. The absorber can be a dye or pigment capable of absorbing light within a desired spectrum. Black dyes and pigments such as carbon black are, of course, generally useful with phosphors, because of their broad absorption spectra. With storage panels, it is preferable to include a dye or pigment which absorbs some of the stimulating radiation, generally provided by a laser; but mostly reflects emitted light. U.S. Pat. No. 4,491,736 to Teraoka teaches the use of such materials in storage panels.

Apart from the phosphor layers and the assembly features described above, the panel can be of any conventional construction. Panels typically have one or more flexible or rigid support layers. Flexible layers are most commonly polymeric. The most common polymeric supports are films of high dimensional integrity, such as poly(ethylene terephthalate) film supports. In a preferred embodiment of the invention, support is provided by one or more polymeric layers and by a rigid plate of aluminum or the like.

Metal layers, such as aluminum, may enhance reflection. Paper supports, though less common than film supports, are known and can be used for specific applications. Dyes and pigments are commonly loaded into supports to enhance absorption or reflection of light. Air can be trapped in supports to reflect ultraviolet and visible light. Supports and the subbing layers used to improve coating adhesion can be chosen from among those employed for silver halide photographic and radiographic elements, as illustrated by *Research Disclosure*, Vol. 176, December 1978, Item 17643, Section XVII, and *Research Disclosure*, Vol. 184, August 1979, Item 18431, Section I.

An overcoat layer, although not required, is commonly located over the luminescent layer for humidity and wear protection. If the panel includes an overcoat layer, the oxosulfur reducing agent can be located in the overcoat layer or the luminescent layer or both. The overcoat layer comprises a binder chosen using the criteria described above for the binder in the luminescent layer. It is understood that the binder used in the overcoat layer, and the binder forming the matrix in which the phosphor particles are held, are preferably formed of transparent resins that do not interfere with the passage of x-rays or stimulating radiation or the emitted light from the phosphors. The overcoat binder can be the same binder as in the luminescent layer or different and can also be chosen from polymers useful for supports. Since it is generally required that the overcoat layer exhibit toughness and scratch resistance, polymers conventionally employed for film supports are favored. For example, cellulose acetate is an overcoat commonly used with the poly(urethane) binders. Overcoat polymers are often used also to seal the edges of the phosphor layer. In a preferred embodiment of the invention, the overcoat is produced in accordance with U.S. Pat. No. 5,401,971 to Roberts.

While anticurl layers are not required for the panels, they are generally preferred for inclusion. The function of the anticurl layer is to balance the forces exerted by the layers coated on the opposite major surface of a support which, if left unchecked, cause the support to assume a non-planar configuration, that is, to curl or roll up on itself. Materials forming the anticurl layers can be chosen from among those identified above for use as binders and overcoats. Generally an anticurl layer is formed of the same polymer as the overcoat on the opposite side of the support. For example, cellulose acetate is preferred for both overcoat and anticurl layers.

Any one or combination of conventional panel features compatible with the features described herein can, of course, be employed. Conventional storage panel constructions are disclosed in U.S. Pat. No. 4,380,702 to Takahashi et al, the disclosure of which is hereby incorporated by reference. Conventional intensifying panel constructions are disclosed in *Research Disclosure*, Vol. 184, August 1979, Item 18431, hereby incorporated herein by reference.

The radiographic panels of the invention are formed by conventional coating techniques. Phosphor powder, oxosulfur reducing agent and other addenda are mixed with a solution of a resin binder material and coated by means such as blade coating onto a substrate. U.S. Pat. No. 4,505,989 to Umemoto et al, the disclosure of which is hereby incorporated herein by reference, describes suitable techniques known in the art for preparing an X-ray image storage panel.

The following Examples and Comparative Examples are presented to further illustrate and elucidate some preferred modes of practice of the invention.

Unless otherwise indicated, all starting materials were commercially obtained. The following are abbreviations used herein for indicated stabilizers and their molecular weights:

$(Me_4N)_2S_2O_3$=tetramethylammonium thiosulfate (molecular weight=260.4);

$(Et_4N)_2S_2O_3$=tetraethylammonium thiosulfate (molecular weight=372.7);

$(CeMe_3N)_2S_2O_3$=cetyltrimethylammonium thiosulfate (molecular weight=681.3);

$(BzEt_3N)_2S_2O_3$=benzyltriethylammonium thiosulfate (molecular weight=496.8);

$(BzMe_3N)_2S_2O_3$=benzyltrimethylammonium thiosulfate (molecular weight=412.6);

$((butyl)_4N)_2S_2O_3$=tetrabutylammonium thiosulfate (molecular weight=354.6);

$(PPN)_2S_2O_3$=bis (triphenylphosphineiminium) thiosulfate (molecular weight=260.4).

The thiosulfate salts were obtained commercially except as follows.

$BaS_2O_3.H_2O$ was prepared according to the following equation:

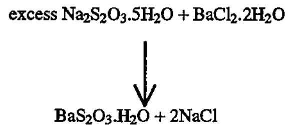

In a typical procedure, barium chloride dihydrate was dissolved in about 2 parts by weight of distilled water and a 2-fold excess of sodium thiosulfate was dissolved separately in about 1.5 parts by weight distilled water. The solutions were filtered to remove insoluble impurities and were then heated to about 40°–50° C. The barium chloride solution was then added via an addition funnel to the thiosulfate solution over about 5 minutes with vigorous stirring, and a white precipitate immediately formed. The precipitate was then collected by vacuum filtration or other means and washed with copious amounts of distilled water to remove any residual sodium chloride by-product. The white solid was then air dried for 24 hours to yield very pure $BaS_2O_3.H_2O$. The product was then analyzed by powder X-ray diffraction to confirm its identity and purity. The $BaS_2O_3.H_2O$ was dried at 150° C. for 24 hours yielding $BAS_2O_3$.

Quaternary ammonium thiosulfate salts were prepared by the following general procedure as in the following equation:

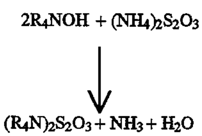

A known amount of tetraalkyl ammonium hydroxide in aqueous or methanol solution was carefully measured, and then diluted by an equal volume of the appropriate solvent. An amount of ammonium thiosulfate corresponding to 2–5% excess of one-half the number of moles of the tetraalkyl ammonium hydroxide was then added and the solution evaporated to dryness by rotoevaporation at 45° C., thus removing the water, $NH_3$ and solvent. The product was then redissolved in $MeOH:H_2O$ (75:25) and the solution again evaporated to dryness. The product was then dried in vacuo over phosphorous pentoxide.

Bis(triphenylphosphine)iminium thiosulfate was prepared as follows: 20.00 grams of triphenylphosphine iminium chloride was dissolved in 400 ml of water and heated to 80° C. 200.0 Grams of sodium thiosulfate was dissolved in 200 ml water and heated to 80° C. The two solutions were then combined whereupon a precipitate immediately formed. The mixture was then allowed to cool to 30°–40° C. and the precipitate recovered by vacuum filtration. The precipitate was washed with 500 ml of cold water to remove any residual sodium chloride and allowed to air dry.

Bunte Compounds: Bunte compounds were prepared by a variation on the procedure reported by Peak and Watkins, *J. Chem Soc.*, (London) 1951, p. 3292, for sodium octylthiosulfate. A representative procedure is given below.

Magnesium Bis(valerate-5-thiosulfate sodium): Into an erlenmeyer flask containing a magnetic stir bar and 50 ml of a 50:50 (volume/volume) mixture of ethanol/water was dissolved 6.82 grams of 5-chlorovaleric acid with stirring. Magnesium carbonate (2.41 grams) was then added and an additional 75 ml of the 50:50 ethanol/water and the contents refluxed for 1 hour. After that time the solution was clear and nearly colorless. Sodium thiosulfate pentahydrate (12.40 grams) was then added and the refluxing continued for another hour. The solvent was then removed on a rotary evaporator leaving an oily liquid. Isopropyl alcohol (100 ml) was then added to the oil with vigorous shaking, at which time a white precipitate appeared, which was then isolated by filtration. The Bunte compound was then extracted with methanol and the solvent removed on a rotary evaporator. The yield was about 90%.

The X-ray phosphors used to prepare coatings were prepared by the following general procedures.

General Preparation of $BaFBr_{1-z}I_z$:$0.001Eu^{2+}$.

In a 2000 ml beaker containing a Teflon coated magnetic stir bar, $BaBr_2.2H_2O$ and $BaI_2.2H_2O$ were added in a combined weight of about 400 grams, and dissolved in distilled water (about 1.5 parts by weight per part of barium salt). The molal ratio of $BaBr_2.2H_2O$ to $BaI_2.2H_2O$ corresponded to the z values specified in the Tables. The solution was then filtered through 0.45 micrometer filter paper and an aliquot of a solution of 0.8 Molar EU(III) in 1 Molar aqueous HBr was added. The aliquot provided 0.001 moles of Eu per mole of barium in the final phosphor formulas indicated in the Tables. To this solution was added, $BaF_2$ in an amount in accordance with the final phosphor formulas indicated in the Tables, with stirring over 60 seconds. The mixture was allowed to stir at 25° C. for 30 minutes and then carefully heated to dryness in a microwave oven over 45–60 minutes or by conventional spray drying. The resulting white cakes were then ground separately with an agate mortar and pestle and placed in 50 ml alumina crucibles. The white powders contained in the crucibles were then heated to 800°–875° C. for 3 hours in a tube furnace containing an atmosphere of dry nitrogen or argon. After cooling in inert atmosphere, the fired phosphor was then ground with an agate mortar and pestle and sieved through a 38 micrometer mesh yielding the finished phosphor.

Preparation of Image Storage Panels:

Image storage panels were prepared by the following general procedure. Phosphor and oxosulfur reducing agent, if any, were dispersed in a 13% (weight/weight) solution of PERMUTHANE™ U-6366 polyurethane marketed by ICI Polyurethanes Group of West Deptford, N.J. in 93:7 (weight/weight) dichloromethane/methanol solvent. The dispersions were often milled 30 minutes with zirconium oxide beads on a paint shaker. The phosphor to binder ratio was about 15:1. Knife-coatings were prepared on a polyethylene terephthalate support. The knife-coatings were allowed to air-dry to produce luminescent layers. After drying, except where noted, the completed storage panels were overcoated with a polymer solution of cellulose acetate in acetone or with a fluorinated polymer, Kynar 7201 marketed by ELF Atochem North America, Inc., of Bloomington, Minn., or equivalent in acetone. For each set of experiments, a comparative example was prepared in an identical manner, except that no amount of stabilizer was added.

The relative photostimulated luminescence (PSL) intensities of the image storage panels were measured by cutting 2.6 centimeter diameter disks from the panels, and simultaneously exposing the sample and a standard to filtered X-radiation. The X-ray source was a tungsten target tube operating at 70 kVp and 3.0 mA. The filtration consisted of a 3.5 centimeter thickness of aluminum. After exposure to X-rays, the samples and standard were stimulated with a 4-millisecond pulse at 633 nanometers from a 12 mW helium-neon laser. The stimulated emission was detected using a photomultiplier tube after passing through a Schott BG-25 filter. The responses were corrected for X-ray exposure variations by normalizing the measured response in each case to an internal standard. The PSL responses for particular Examples are reported relative to a Comparative Example handled in an identical manner, but which did not contain a oxosulfur reducing agent as stabilizer. The response of the Comparative Example in each case was arbitrarily set equal to 100. The measured PSL responses were corrected for variations in phosphor coverage by dividing by the coverage value determined for that particular disk.

The resolution of the image storage panels was determined by measuring the MTF(h) value. MTF (modulation transfer function) was calculated as the modulus of the fourier transform of the line spread function (LSF), which was determined by imaging a narrow slit x-ray exposure of the panel of the example or comparative example. The exposed panel was raster-scanned using a helium-neon laser, at 633 nanometers, focused to a 100 micron spot size. The same laser power level was used for all measurements. The digitization rate was such that an effective pixel spacing of 25 micrometers was achieved in the direction of the moving beam. The spacing between sequential scans of the laser beam (lines of the image) was 250 micrometers. The direction of the scanning beam was perpendicular to the direction of the slit x-ray exposure. The LSF was obtained by averaging together several sequential lines to generate a one-dimensional profile of the slit x-ray exposure. Values are reported as MTF(h), which is the spatial frequency at which MTF drops to 50 % of maximum.

EXAMPLES 1*a*–4*c* AND COMPARATIVE EXAMPLES 1*a*–4

The following general procedure was followed using binder-compatible oxosulfur reducing agent and oxosulfur reducing pigment as indicated in Table 1. Image storage panels were prepared from the same lot of $BaFBr_{0.85}I_{0.15}$:$0.001Eu^{2+}$ storage phosphor as described above. To the phosphor or phosphor dispersion prior to coating was then added an amount of pigmented and/or binder compatible thiosulfate stabilizer. The amounts and chemical compositions of the stabilizers are given in Table 1, all values are expressed as percent of phosphor loading (weight/weight). Image storage panels were then prepared as above-described. The comparative examples were prepared in an identical manner except that the amounts of stabilizer (s) were adjusted as given in Table 1.

TABLE 1

Speed (PSL response) and resolution (MTF (h)) of image storage panels

| Ex or Comp Ex | Stabilizer (wt/wt%) | PSL | MTF (h) |
|---|---|---|---|
| Comp Ex 1a (control) | 2% $BaS_2O_3$ | 100 | 1.48 |
| Comp Ex 1b | 2% $(Et_4N)_2S_2O_3$ | 111 | 1.34 |
| Comp Ex 1c | 2% $(CeMe_3N)_2S_2O_3$ | 113 | 1.38 |
| Ex 1a | 1% $BaS_2O_3$ + 1% $(Et_4N)_2S_2O_3$ | 114 | 1.41 |
| Ex 1b | 1% $BaS_2O_3$ + 1% $(CeMe_3N)_2S_2O_3$ | 116 | 1.45 |
| Comp Ex 2 (control) | 2% $BaS_2O_3$ | 100 | 1.28 |

TABLE 1-continued

Speed (PSL response) and resolution (MTF (h)) of image storage panels

| Ex or Comp Ex | Stabilizer (wt/wt%) | PSL | MTF (h) |
|---|---|---|---|
| Ex 2 | 1% $BaS_2O_3$ + 0.5% $(Et_4N)_2S_2O_3$ | 112 | 1.27 |
| Comp Ex 3a (control) | 2% $BaS_2O_3$ | 100 | 1.30 |
| Comp Ex 3b | 1% $(Et_4N)_2S_2O_3$ | 110 | 1.24 |
| Ex 3 | 1% $BaS_2O_3$ + 1% $(Et_4N)_2S_2O_3$ | 116 | 1.29 |
| Comp Ex 4 (control) | 2% $BaS_2O_3$ | 100 | 1.26 |
| Ex 4a | 2% $BaS_2O_3$ + 1% $(Et_4N)_2S_2O_3$ | 107 | 1.26 |
| Ex 4b | 2% $BaS_2O_3$ + 1% $(BzMe_3N)_2S_2O_3$ | 109 | 1.16 |
| Ex 4c | 2% $BaS_2O_3$ + 1% $(BzEt_3N)_2S_2O_3$ | 105 | 1.21 |

Comparative Examples A–I and J(control)

Image storage panels were prepared from $BaFBr_{0.80}I_{0.20}:0.001Eu^{2+}$ storage phosphor as above described. Oxosulfur reducing pigments were dispersed in the luminescent layer as indicated in Tables 2 and 3. In Comparative Example J(control), no oxosulfur reducing pigment was present. Concentrations of oxosulfur reducing pigments are indicated in Tables 2–3, and the other tables, as weight/weight percentages ((wt/wt)%) based upon the weight of the phosphor. The storage panels were then overcoated with Kynar 7201. The photostimulated luminescence (PSL) values and MTF values were measured as above-described and are reported in Tables 2–3.

TABLE 2

The effect of $BaS_2O_3$ in luminescent layer of $BaFBr_{0.80}I_{0.20}:0.001Eu^{2+}$ image storage panels

| Comparative Example | (wt/wt)% $BaS_2O_3$ added | PSL Response | MTF (h) |
|---|---|---|---|
| Comparative Example A | 0.1 | 129 | 1.19 |
| Comparative Example B | 1.0 | 151 | 1.08 |
| Comparative Example C | 2.5 | 157 | 1.07 |
| Comparative Example D | 6.0 | 152 | 1.10 |
| Comparative Example E | 10.0 | 142 | 1.19 |
| Comparative Example J(control) | 0.0 | 100 | 1.13 |

TABLE 3

The effect of various oxosulfur reducing pigments in luminescent layer of $BaFBr_{0.80}I_{0.20}:0.001Eu^{2+}$ image storage panels

| Comparative Example | Oxosulfur Reducing Pigment Added: 2% (wt/wt) | PSL Response |
|---|---|---|
| Comparative Example F | $(NH_4)_2S_2O_3$ | 176 |
| Comparative Example G | $MgS_2O_3 \cdot 3H_2O$ | 113 |
| Comparative Example H | $K_2S_2O_3$ | 158 |

TABLE 3-continued

The effect of various oxosulfur reducing pigments in luminescent layer of $BaFBr_{0.80}I_{0.20}:0.001Eu^{2+}$ image storage panels

| Comparative Example | Oxosulfur Reducing Pigment Added: 2% (wt/wt) | PSL Response |
|---|---|---|
| Comparative Example I | $Na_2S_2O_3$ | 154 |
| Comparative Example J | none | 100 |

Comparative Examples K and L(control)

An image storage panel was prepared and evaluated by the same procedures as in Comparative Examples A–J, with the exception that in Comparative Example K, the phosphor was $BaFBr_{0.95}I_{0.05}:0.001Eu^{2+}$ and the dispersion was not milled. In Comparative Example L(control), no oxosulfur reducing pigment was present. An overcoat solution of cellulose acetate was applied. Results are presented in Table 4.

TABLE 4

The effect of $BaS_2O_3$ in luminescent layer of $BaFBr_{0.80}I_{0.20}:0.001Eu^{2+}$ image storage panels

| Comparative Example | (wt/wt) % $BaS_2O_3$ | PSL Response |
|---|---|---|
| Comparative Example K | 2.5 | 152 |
| Comparative Example L(control) | none | 100 |

Comparative Examples M and N(control)

In Comparative Example M, an image storage panel was prepared and evaluated by the same procedures as Comparative Example K, with the exception that the phosphor was $BaFBr_{0.50}I_{0.50}:0.001Eu^{2+}$. In Comparative Example N(control) a storage panel was prepared and evaluated in the same manner and at the same time as in Comparative Example M except no oxosulfur reducing pigment was present. Results are presented in Table 5.

TABLE 5

The effect of $BaS_2O_3$ in luminescent layer of $BaFBr_{0.80}I_{0.20}:0.001Eu^{2+}$ image storage panels

| Comparative Example | (wt/wt) % $BaS_2O_3$ | PSL Response |
|---|---|---|
| Comparative Example M | 2.5 | 145 |
| Comparative Example N (control) | none | 100 |

Comparative Examples O, P and Q(control)

In Comparative Example O, an image storage panel was prepared and evaluated by the same procedures as Comparative Example A, with the exception that the dispersion was not milled. In Comparative Example P, an image storage panel was prepared and evaluated in the same manner and at the same time as in Comparative Example O except barium sulfate (white pigment) was present in the luminescent layer instead of oxosulfur reducing pigment. In Comparative Example P(control) a storage panel was prepared and evaluated in the same manner and at the same time as in Comparative Examples N and O except no oxosulfur reducing pigment was present. Results are presented in Table 6.

TABLE 6

Comparison of the effect of $BaS_2O_3$ and the effect of $BaSO_4$ in luminescent layer of $BaFBr_{0.80}I_{0.20}$:$0.001Eu^{2+}$ image storage panels

| Comparative Example | Addenda 2 (wt/wt) % | PSL Response |
|---|---|---|
| Comparative Example 0 | $BaS_2O_3$ | 119 |
| Comparative Example P | $BaSO_4$ | 90 |
| Comparative Example Q(control) | none | 100 |

Comparative Examples R and S(control)

The luminescent layer of an image storage panel was prepared by the same procedure as in Comparative Example A, except no oxosulfur reducing pigment was added to the luminescent layer. In Comparative Example R, the overcoat solution of cellulose acetate in acetone was prepared and $BAS_2O_3$ was added (0.50 weight percentage based upon the weight of the phosphor in the luminescent layer). The resulting mixture was applied to form an overcoat layer. In Comparative Example S(control) A storage panel was prepared and evaluated in the same manner and at the same time as in Comparative Example R except no oxosulfur reducing pigment was added to the overcoat layer. Results are presented in Table 7.

TABLE 7

The effect of $BaS_2O_3$ in overcoat layer of $BaFBr_{0.80}I_{0.20}$:$0.001Eu^{2+}$ image storage panels

| Comparative Example | Overcoat addenda 0.5 (wt/wt) % | PSL Response |
|---|---|---|
| Comparative Example R | $BaS_2O_3$ | 110 |
| Comparative Example S(control) | none | 100 |

Comparative Examples T-V and W(control)

Image storage panels were prepared with $BaFBr_{0.80}I_{0.20}$:$0.001Eu^{2+}$ storage phosphor as above described, without milling. Oxosulfur reducing agents: bis (tetraethylammonium) thiosulfate, bis-(tetrabutylammonium) thiosulfate, and bis (triphenylphosphine)iminium thiosulfate, were dispersed in the luminescent layer as indicated in Table 8, by the formulas: $((ethyl)_4N)_2S_2O_3$, $((butyl)_4N)_2S_2O_3$, and $(PPN)_2S_2O_3$, respectively. Concentrations of oxosulfur reducing agents are indicated in Table 8, (and the other tables for other examples and comparative examples), as weight percentages ((wt/wt)%) based upon the weight of the phosphor. In Comparative Example W(control), no oxosulfur reducing pigment was present. The storage panels were then overcoated with cellulose acetate, (applied as an acetone solution). The photostimulated luminescence (PSL) values were measured as above-described and are reported in Table 8.

TABLE 8

The effect of oxosulfur reducing agents in luminescent $BaFBr_{0.80}I_{0.20}$:$0.001Eu^{2+}$ image storage panels

| Comparative Example | Oxosulfur reducing agent | (wt/wt) % added | PSL Response |
|---|---|---|---|
| Comparative Example T | $[(ethyl)_4N]_2S_2O_3$ | 2.0 | 133 |
| Comparative Example U | $[(butyl)_4N]_2S_2O_3$ | 2.0 | 163 |
| Comparative Example V | $(PPN)_2S_2O_3$ | 2.0 | 146 |
| Comparative Example W(control) | — | none | 100 |

Comparative Examples X-Y and Z(control)

In Comparative Example X, an image storage panel was prepared and evaluated by the same procedures as in Comparative Example T, with the exception that no overcoat layer was applied. A sample was then cut from the storage panel and exposed to the ambient environment for aging. Comparative Examples Y and Z(control) were prepared and evaluated at the same time and in the same manner, with the exception that $BAS_2O_3$ was added at a concentration of 2 weight percent in Comparative Example Y instead of a binder-compatible oxosulfur reducing agent and no oxosulfur stabilizer was used in Comparative Example Z(control). Comparative Example X had better initial and long term photostimulated luminescence that Comparative Example Y. Yellowing in the ambient environment was too rapid to permit evaluation of photostimulated luminescence.

Comparative Examples AA–AB and AC(control)

An image storage panel were prepared by the same procedures as in Comparative Example T, with the exception of the overcoat layer. Separate areas of the panel were then overcoated with the following overcoat solutions: (Comparative Example AA) cellulose acetate in acetone +0.5 wt %$[(ethyl)_4N]_2S_2O_3$; (Comparative Example AB) cellulose acetate in acetone +0.5 wt % $BAS_2O_3$; and (Comparative Example AC) cellulose acetate in acetone. Samples were cut from the respective panels and were evaluated in the same manner as in Comparative Example T after aging at 90° F. and 90% relative humidity. Results as to initial sensitivity are presented in Table 9.

TABLE 9

The effect of oxosulfur reducing agents in overcoat layer of $BaFBr_{0.80}I_{0.20}$:$0.001Eu^{2+}$ image storage panels

| Comparative Example | Oxosulfur reducing agent in overcoat | PSL Response |
|---|---|---|
| Comparative Example AA | 0.5 wt % $(Et_4N)_2S_2O_3$ | 127 |
| Comparative Example AB | 0.5 wt % $BaS_2O_3$ | 110 |
| Comparative Example AC(control) | none | 100 |

Examples Ad–Ai And Ai(control)

Image storage panels were prepared using $BaFBr_{0.8}I_{0.2}$:$0.001Eu^{2+}$ storage phosphor as in Comparative Example T except Bunte compounds, as indicated in Table 10, were added as oxosulfur reducing agent. The concentration of Bunte compound added to the binder/phosphor/solvent mixture was 2 weight percent relative to the weight of the phosphor. In Comparative Example AJ(control) no oxosulfur stabilizer was added. The panels were then evaluated as in Comparative Example T.

Samples (punches 1 inch in diameter) were taken from the image storage panels. The punches were then placed in an environment maintained at 103° F. (±2° F.) and 86% relative humidity.

Results are presented in Tables 10–11. In Table 11, the rate of decay is slope of a graph of the number of PSL response points the image storage panel lost per day. The slope control/slope sample is the ratio of rate of decay of the Comparative Example AJ(control) over the rate of decay of the other Comparative Example. The "solubility rank" denotes the relative solubility of each of the Bunte compounds in the binder solvent.

TABLE 10

The effect of addition of Bunte compounds, upon the speed of image storage panels

| Comparative Example | Bunte compound 2 (wt/wt) % | PSL Response |
|---|---|---|
| Comparative Example AD | $CH_3(CH_2)_4S_2O_3Na$ | 123 |
| Comparative Example AE | $Mg[O_2C(CH_2)_4S_2O_3Na]_2$ | 131 |
| Comparative Example AF | $Mg(S_2O_3CH_2CH_2NH_2)_2$ | 132 |
| Comparative Example AG | $KO_2C(CH_2)_4S_2O_3K$ | 137 |
| Comparative Example AH | $NaO_2C(CH_2)_7S_2O_3Na$ | 136 |
| Comparative Example AI | $Mg(O_2C(CH_2)_4S_2O_3)$ | 153 |
| Comparative Example AJ(control) | none | 100 |

TABLE 11

The effect of Bunte compounds upon the long term keeping stability of image storage panels

| Comp. Ex | Bunte Compound 2 (wt/wt) % | rate of decay | slope control/slope sample | sol. rank |
|---|---|---|---|---|
| Comp. Ex AD | $CH_3(CH_2)_4S_2O_3Na$ | −9.8 | 11.6 | 2 |
| Comp. Ex AE | $Mg[O_2C(CH_2)_4S_2O_3Na]_2$ | −4.5 | 25.3 | 1 |
| Comp. Ex AF | $Mg(S_2O_3CH_2CH_2NH_2)_2$ | −7.9 | 14.4 | 3 |
| Comp. Ex AG | $KO_2C(CH_2)_4S_2O_3K$ | −46.6 | 2.4 | 5 |
| Comp. Ex AH | $NaO_2C(CH_2)_7S_2O_3Na$ | −14.1 | 8.1 | 4 |
| Comp. Ex AJ | none | −114 | 1.0 | — |

The Examples and Comparative Examples demonstrate that oxosulfur stabilizers provide protection against iodine related yellowing and that binder-compatible oxosulfur reducing agents provide better protection than oxosulfur reducing pigments. In direct comparisons, a higher resolution (MTF) and lower speed⁻ (PSL) than a screen having only an equal weight of binder-compatible oxosulfur reducing agent. These different effects can be explained. (The scope of the claimed invention is not limited by any particular explanation or theory.) The higher resolution of the oxosulfur reducing pigment screen is believed to be a function of light scattering caused by the pigment particles. The higher speed of the binder-compatible stabilizer screen is believed to be a function of the molecular or near molecular dispersion of the binder-compatible oxosulfur reducing agent in the binder. This explanation would lead one to expect that a screen having the pigment stabilizer and binder compatible stabilizer in combination should have intermediate values for speed and resolution. In the Examples, this prediction holds true for resolution, but the speed of storage panels having a mixture of oxosulfur reducing pigment and binder-compatible oxosulfur reducing agent was higher than panels having equal weight of either stabilizer alone. This is highly surprising and not currently understood.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A radiographic phosphor panel comprising a support and a luminescent layer overlaying said support; said luminescent layer including phosphor crystals, binder, oxosulfur reducing agent, and oxosulfur reducing pigment; said phosphor crystals including iodine; said oxosulfur reducing agent being dispersed within said luminescent layer on a substantially molecular basis, said oxosulfur reducing pigment being dispersed within said layer as a particulate, said oxosulfur reducing agent and said oxosulfur reducing pigment each being a reducing agent for iodine, said oxosulfur reducing agent and said oxosulfur reducing pigment having a combined concentration sufficient to substantially increase the photostimulated luminescence of said panel.

2. The radiographic phosphor panel of claim 1 wherein said binder comprises organic polymer and said oxosulfur reducing agent and said binder form a solvent-cast matrix for said phosphor.

3. The radiographic phosphor panel of claim 1 wherein said oxosulfur reducing agent is selected from the group consisting of organic oxosulfur salts having anions having the general formula $S_jO_k$ wherein $0.25<j/k<1.0$ and Bunte compounds, having the general formula $R'SSO_3D$, where R' is a covalently bonded organic substituent and D is a counterion.

4. The radiographic phosphor panel of claim 3 wherein said oxosulfur reducing agent is selected from the group consisting of: organic salts of $SO_3^{2-}$, $S_2O_4^{2-}$, $S_2O_3^{2-}$, $S_2O_5^{2-}$, and $S_4O_6^{2-}$.

5. The radiographic phosphor panel of claim 3 wherein said oxosulfur reducing pigment is selected from the group consisting of inorganic oxosulfur salts having anions having the general formula $S_jO_k$ wherein $0.25<j/k<1.0$.

6. The radiographic phosphor panel of claim 3 wherein said oxosulfur reducing pigments are selected from the group consisting of: inorganic salts of $SO_3^{2-}$, $S_2O_4^{2-}$, $S_2O_3^{2-}$, $S_2O_5^{2-}$, and $S_4O_6^{2-}$.

7. The radiographic phosphor panel of claim 3 wherein said oxosulfur reducing pigment is a thiosulfate salt.

8. The radiographic phosphor panel of claim 1 wherein said oxosulfur reducing pigment is selected from the group consisting of inorganic oxosulfur salts having anions having the general formula $S_jO_k$ wherein $0.25<j/k<1.0$.

9. The radiographic phosphor panel of claim 1 wherein said reducing agents are selected from the group consisting of: inorganic and organic salts of $SO_3^{2-}$, $S_2O_4^{2-}$, $S_2O_3^{2-}$, $S_2O_5^{2-}$, and $S_4O_6^{2-}$.

10. The radiographic phosphor panel of claim 1 wherein said oxosulfur reducing pigment is a thiosulfate salt.

11. The radiographic phosphor panel of claim 1 wherein the total weight of said oxosulfur reducing agent and said oxosulfur reducing pigment is less than 4 percent of the weight of the phosphor.

12. The radiographic phosphor panel of claim 1 wherein said phosphor is selected from the group consisting of divalent alkaline earth metal fluorohalide phosphors containing iodine and alkali metal halide phosphors containing iodine.

13. The radiographic phosphor panel of claim 1 wherein said phosphor comprises a combination of species characterized by the relationship:

$$MFX_{1-z}I_z.uM^aX^a:yA:eQ:tD$$

wherein

M is selected from the group consisting of Mg, Ca, Sr, and Ba;

X is selected from the group consisting of Cl and Br;

Ma is selected from the group consisting of Na, K, Rb, and Cs;

Xa is selected from the group consisting of F, Cl, Br, and I;

A is selected from the group consisting of Eu, Ce, Sm, and Tb;

Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$;

D is selected from the group consisting of V, Cr, Mn, Fe, Co, and Ni;

z is from $1\times10^{-4}$ to 1;

u is from 0 to 1;

y is from $1\times10^{-4}$ to 0.1;

e is from 0 to 1; and t is from 0 to $1\times10^{-2}$.

14. The radiographic phosphor panel of claim 1 wherein said phosphor comprises a combination of species characterized by the relationship:

$$(Ba_{1-a-b-c}Mg_aCa_bSr_c)FX_{1-z}I_z rM^aX^a: yA: eQ$$

wherein

X is selected from the group consisting of Cl and Br;

Ma is selected from the group consisting of Na, K, Rb, and Cs;

Xa is selected from the group consisting of F, Cl, Br, and I;

A is selected from the group consisting of Eu, Ce, Sm, and Tb;

Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$;

a+b+c is from 0 to 0.4;

z is from $1\times10^{-4}$ to 1;

r is from $1\times10^{-6}$ to 0.1;

y is from $1\times10^{-4}$ to 0.1;

e is from $1\times10^{-5}$ to 0.1.

15. A radiographic phosphor panel comprising a support, a luminescent layer overlaying said support, and an overcoat layer overlaying said luminescent layer; said luminescent layer including phosphor crystals; said phosphor crystals including iodine; at least one said layer including an organic polymer binder and an oxosulfur reducing agent; said oxosulfur reducing agent being dispersed within said layer on a substantially molecular basis; said oxosulfur reducing agent being is selected from the group consisting of organic oxosulfur salts having anions having the general formula $S_jO_k$ wherein $0.25<j/k<1.0$ and Bunte compounds, having the general formula $R'SSO_3D$, where R' is a covalently bonded organic substituent and D is a counterion; at least one said layer including an oxosulfur reducing pigment; said oxosulfur reducing pigment being selected from the group consisting of inorganic oxosulfur salts having anions having the general formula $S_jO_k$ wherein $0.25<j/k<1.0$; said oxosulfur reducing agent and said oxosulfur reducing pigment each being a reducing agent for iodine, said oxosulfur reducing agent and said oxosulfur reducing pigment having a combined concentration sufficient to substantially increase the photostimulated luminescence of said panel.

16. The radiographic phosphor panel of claim 15 wherein said oxosulfur reducing agent and said oxosulfur reducing pigment are each selected from the group consisting of: inorganic and organic salts of $SO_3^{2-}$, $S_2O_4^{2-}$, $S_2O_3^{2-}$, $S_2O_5^{2-}$, and $S_4O_6^{2-}$.

17. The radiographic phosphor panel of claim 15 wherein said oxosulfur reducing agent and said oxosulfur reducing pigment are each selected from the group consisting of inorganic and organic thiosulfate salts.

18. The radiographic phosphor panel of claim 15 wherein said oxosulfur reducing agent comprises bis (tetraethylammonium) thiosulfate.

19. A method for preparing a radiographic phosphor panel comprising forming a plurality of layers on a support, at least one said layer having radiographic phosphor crystals, at least one said layer having an organic polymer binder and a binder-compatible oxosulfur reducing agent, at least one said layer having dispersed therein oxosulfur reducing pigment, said oxosulfur reducing agent and said oxosulfur reducing pigment each being reducing agents for iodine and each being selected from the group consisting of inorganic and organic oxosulfur salts having anions of the general formula $S_jO_k$ wherein $0.25<j/k<1.0$ and Bunte compounds, having the general formula $R'SSO_3D$, where R' is a covalently bonded organic substituent and D is a counterion.

20. The method of claim 19 further comprising solvent casting together said oxosulfur reducing agent, said oxosulfur reducing pigment, and binder for one of said layers.

* * * * *